(12) United States Patent
Terada et al.

(10) Patent No.: US 9,122,265 B2
(45) Date of Patent: Sep. 1, 2015

(54) NUMERICAL CONTROL DEVICE FOR DRILLING AND TAPPING WITH TWO SYNCHRONIZED SPINDLES

(75) Inventors: Koji Terada, Tokyo (JP); Masakazu Sagasaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 451 days.

(21) Appl. No.: 13/809,810

(22) PCT Filed: Feb. 8, 2012

(86) PCT No.: PCT/JP2012/000826
§ 371 (c)(1),
(2), (4) Date: Jan. 11, 2013

(87) PCT Pub. No.: WO2013/118169
PCT Pub. Date: Aug. 15, 2013

(65) Prior Publication Data
US 2013/0204427 A1 Aug. 8, 2013

(51) Int. Cl.
G05B 19/19 (2006.01)
G05B 19/18 (2006.01)

(52) U.S. Cl.
CPC .............. *G05B 19/19* (2013.01); *G05B 19/186* (2013.01); *G05B 2219/34333* (2013.01); *G05B 2219/50008* (2013.01); *G05B 2219/50225* (2013.01)

(58) Field of Classification Search
None
See application file for complete search history.

(56) References Cited

U.S. PATENT DOCUMENTS

| 4,612,690 | A | * | 9/1986 | Baker ............................ 29/33 P |
| 4,612,832 | A | * | 9/1986 | Ushigoe et al. ................. 82/129 |

(Continued)

FOREIGN PATENT DOCUMENTS

| JP | 4736173 A | 11/1972 |
| JP | 6044239 A | 3/1985 |

(Continued)

OTHER PUBLICATIONS

International Search Report dated Apr. 10, 2012 from the International Searching Authority in counterpart application No. PCT/JP2012/000826.

(Continued)

*Primary Examiner* — Mohammad Ali
*Assistant Examiner* — Bernard G Lindsay
(74) *Attorney, Agent, or Firm* — Sughrue Mion, PLLC; Richard C. Turner (57) ABSTRACT

A numerical control device including tapping spindle (S1, S2) time constant selecting means that compares acceleration and deceleration time constants of the S1 and S2 axes and selects the larger time constant, drilling axis (X1) acceleration and deceleration processing means that calculates an acceleration and deceleration movement amount of the X1 axis based on the selected spindle time constant and a commanded spindle rotation number and moves the drilling axis to the calculated position, synchronized tapping interpolation processing means that synchronizes the tapping spindle with the drilling axis based on the movement amount output from the drilling axis (X1) acceleration and deceleration processing means and a pitch, and tapping spindle synchronization processing means that transfers the rotation amount of the tapping spindle output from tapping spindle (S1)-drilling axis (X1) synchronization processing means to the synchronized side.

2 Claims, 6 Drawing Sheets

(56) References Cited

U.S. PATENT DOCUMENTS

| | | | |
|---|---|---|---|
| 4,635,340 A | | 1/1987 | Link |
| 4,683,787 A | | 8/1987 | Link |
| 5,047,702 A | * | 9/1991 | Hanaki et al. .................. 318/625 |
| RE33,732 E | | 11/1991 | Link |
| RE34,155 E | | 1/1993 | Link |
| 6,298,531 B1 | * | 10/2001 | Baumbusch et al. ............. 29/40 |
| 6,324,949 B1 | | 12/2001 | Link et al. |
| 2011/0088523 A1 | * | 4/2011 | Yamada ......................... 82/1.11 |

FOREIGN PATENT DOCUMENTS

| | | |
|---|---|---|
| JP | 333441 B2 | 5/1991 |
| JP | 4244350 A | 9/1992 |
| JP | 10202428 A | 8/1998 |
| JP | 11156638 A | 6/1999 |
| JP | 2000218422 A | 8/2000 |
| JP | 2001134321 A | 5/2001 |
| JP | 2001277048 A | 10/2001 |

OTHER PUBLICATIONS

Written Opinion dated Apr. 10, 2012 from the International Searching Authority in counterpart application No. PCT/JP2012/000826.

* cited by examiner

FIG. 1

EXPLANATION OF OPERATION (ASSUMED THAT TOOL IS REPLACED WITH TAPPING TOOL AND C AXIS MODE IS SELECTED)
(1) MAKE TOOL DIRECTION AND X AXIS DIRECTION OF VIRTUAL PLANE PARALLEL
(2) GIVE VIRTUAL Y AXIS INTERPOLATION MODE ON COMMAND AND VIRTUAL
    Y SYNCHRONIZATION ON COMMAND
(3) MOVE TO MACHINING START POSITION
(4) PERFORM TAPPING
(5) MAKE TOOL DIRECTION AND X AXIS DIRECTION OF VIRTUAL PLANE PARALLEL
(6) GIVE VIRTUAL Y AXIS INTERPOLATION MODE OFF COMMAND AND VIRTUAL
    Y SYNCHRONIZATION OFF COMMAND
(7) RETURN TO INITIAL POSITION

PROGRAM EXAMPLE

```
        $1
        :
N099 G00 X100 C0 H0
N100 M121(VIRTUAL Y ON)
     !2
M131(VIRTUAL Y SYNCHRONIZATION ON)
     !2
N101 G00 X50 Y50
N102 G84 X10.F1.S1=S2 S100.,R2
N103 G00 X50 Y0
     !2
N104 M130(VIRTUAL Y SYNCHRONIZATION OFF)
     M120(VIRTUAL Y OFF)
     !2
N105 G00 X100
     :
```

| S1 SYNCHRONIZED TAPPING ACCELERATION AND DECELERATION TIME CONSTANT 1 |
|---|
| S1 SYNCHRONIZED TAPPING ACCELERATION AND DECELERATION TIME CONSTANT 2 |
| S1 SYNCHRONIZED TAPPING ACCELERATION AND DECELERATION TIME CONSTANT 3 |
| S2 SYNCHRONIZED TAPPING ACCELERATION AND DECELERATION TIME CONSTANT 1 |
| S2 SYNCHRONIZED TAPPING ACCELERATION AND DECELERATION TIME CONSTANT 2 |
| S2 SYNCHRONIZED TAPPING ACCELERATION AND DECELERATION TIME CONSTANT 3 |
| S1 SYNCHRONIZED TAPPING SWITCHING SPINDLE ROTATION RATE 1 |
| S1 SYNCHRONIZED TAPPING SWITCHING SPINDLE ROTATION RATE 2 |
| S1 SYNCHRONIZED TAPPING SWITCHING SPINDLE ROTATION RATE 3 |
| S2 SYNCHRONIZED TAPPING SWITCHING SPINDLE ROTATION RATE 1 |
| S2 SYNCHRONIZED TAPPING SWITCHING SPINDLE ROTATION RATE 2 |
| S2 SYNCHRONIZED TAPPING SWITCHING SPINDLE ROTATION RATE 3 |

| SIMULTANEOUS SYNCHRONIZED TAPPING ACCELERATION AND DECELERATION TIME CONSTANT 1 |
|---|
| SIMULTANEOUS SYNCHRONIZED TAPPING ACCELERATION AND DECELERATION TIME CONSTANT 2 |
| SIMULTANEOUS SYNCHRONIZED TAPPING ACCELERATION AND DECELERATION TIME CONSTANT 3 |
| SIMULTANEOUS SYNCHRONIZED TAPPING ACCELERATION AND DECELERATION TIME CONSTANT 4 |
| SIMULTANEOUS SYNCHRONIZED TAPPING ACCELERATION AND DECELERATION TIME CONSTANT 5 |
| SIMULTANEOUS SYNCHRONIZED TAPPING SWITCHING SPINDLE ROTATION RATE 1 |
| SIMULTANEOUS SYNCHRONIZED TAPPING SWITCHING SPINDLE ROTATION RATE 2 |
| SIMULTANEOUS SYNCHRONIZED TAPPING SWITCHING SPINDLE ROTATION RATE 3 |
| SIMULTANEOUS SYNCHRONIZED TAPPING SWITCHING SPINDLE ROTATION RATE 4 |
| SIMULTANEOUS SYNCHRONIZED TAPPING SWITCHING SPINDLE ROTATION RATE 5 |

NUMERICAL CONTROL DEVICE FOR DRILLING AND TAPPING WITH TWO SYNCHRONIZED SPINDLES

TECHNICAL FIELD

The present invention relates to a workpiece machining technique using a numerically-controlled turning machine which is controlled by a numerical control (hereinafter, also abbreviated as NC) device. More particularly, the present invention relates to an eccentric machining process of performing machining operations such as drilling on a position separated in the Y axis direction from the X coordinate axis in a plane of a workpiece perpendicular to the XZ plane and perpendicular to the X axis direction in a turning process.

BACKGROUND ART

In conventional art, as a type of combined machining turning machine, a combined machining turning machine has been known which includes a Y axis as an additional axis perpendicular to the X (workpiece radius direction)-Z (workpiece axis direction) plane and which can perform a drilling process on a position separated in the Y axis direction from the X coordinate axis.

As another type, a turning machine has been known having a C axis that holds a workpiece and of which the rotational position is controlled, an X axis of which the position is controlled to approach and separate with respect to the center of the C axis, a Z axis that similarly moves in the axis direction of the C axis, and a turret axis (H axis) that is driven by the X axis and the Z axis and that can rotate at any angle to be perpendicular to the axis line of the C axis. Such a turning machine can perform a planar machining process in the circumferential direction of the workpiece by the use of a virtual Y axis which is not actually present, in addition to a normal turning process on the circumferential surface of a workpiece. This machining process is called a D-cut, in that a cross-section similar to letter D is obtained by linearly cutting off a part of a circular cross-section.

When the D-cut machining process is performed on both sides of a workpiece, a double D-cut (may be referred to as a spanner cut, in that the cross-section of a machined workpiece has a shape similar to the opening of a spanner) having a shape in which both sides of a circular cross-section are cut out is obtained. Such a shape can be obtained by performing the D-cut machining process twice by the use of the machine of the conventional art.

In order to implement the D-cut machining process by the use of the machine having the latter type, a plane separated from the center by an arbitrary distance in the radius direction of a workpiece held on the C axis is imagined, a rotating tool on the H axis is made to face the center of the C axis, the H axis rotates so as to direct the tool in the direction of the center of the C axis at a position separated from the center of the C axis, and the C axis rotates so as to be perpendicular to the tool. At this time, since a position separated in the Y axis direction from a line connecting the center of the C axis and the center of the H axis is a machining point, a machining surface and a tool tip are separated from each other. Accordingly, it is necessary to calculate this distance and to move the center of the H axis toward the center of the C axis (in the X axis direction). By performing this series of controls continuously from one end to the other end of a plane imagined on the circumference of a workpiece on the C axis so that a speed along the virtual Y axis is a command speed, a desired machining process can be embodied. The position of the X axis is controlled depending on the distance of a tool tip (=machining point) from the center of the workpiece.

Patent Reference 1 discloses that a rotational motion of a C axis and a rotational motion of a tool (turret axis) are mechanically synchronized to implement the above-mentioned machining process. Patent Reference 2 discloses a configuration of a machine having six sets, each of which has a configuration implementing the same operation as described above through the use of overall servo control, and an operating method thereof. These patent references describe structure of a machine or operations of respective elements thereof, whereby it is possible to perform a so-called D-cut machining process or a drilling process on a plane of the D-cut surface, under the control thereof.

Machining details similar to the D-cut machining process are shown in Patent Reference 3, but since it is a machine having an X axis, a Z axis, a spindle/C axis, and a fixed-angle dividing turret, Y axis control cannot be controlled. Accordingly, when a drilling process is performed on an outer circumferential surface of a workpiece, all directions of formed holes are directed to the center of the workpiece and thus the holes perpendicular to the plane of the D-cut surface of the spanner-cut surfaces cannot be formed.

[Patent Reference 1] JP-B-H03-033441 (related description: line 32 of column 16 of page 8 to line 28 of column 17 of page 9, line 18 of column 18 of page 9 to line 29 of column 19 of page 10, FIG. 3, and FIG. 4)

[Patent Reference 2] JP-A-2000-218422 (related description: line 25 of column 7 of page 5 to line 34 of the same column, line 25 of column 18 of page 10 to line 32 of column 19 of page 11, FIGS. 7 to 11)

[Patent Reference 3] JP-A-S60-044239 (related description: column 4 of page 5 to line 17 of column 2 of page 6, the linear shape (1e) of the outer circumferential machining in FIG. 10)

DISCLOSURE OF INVENTION

Technical Problem

Figure 7:
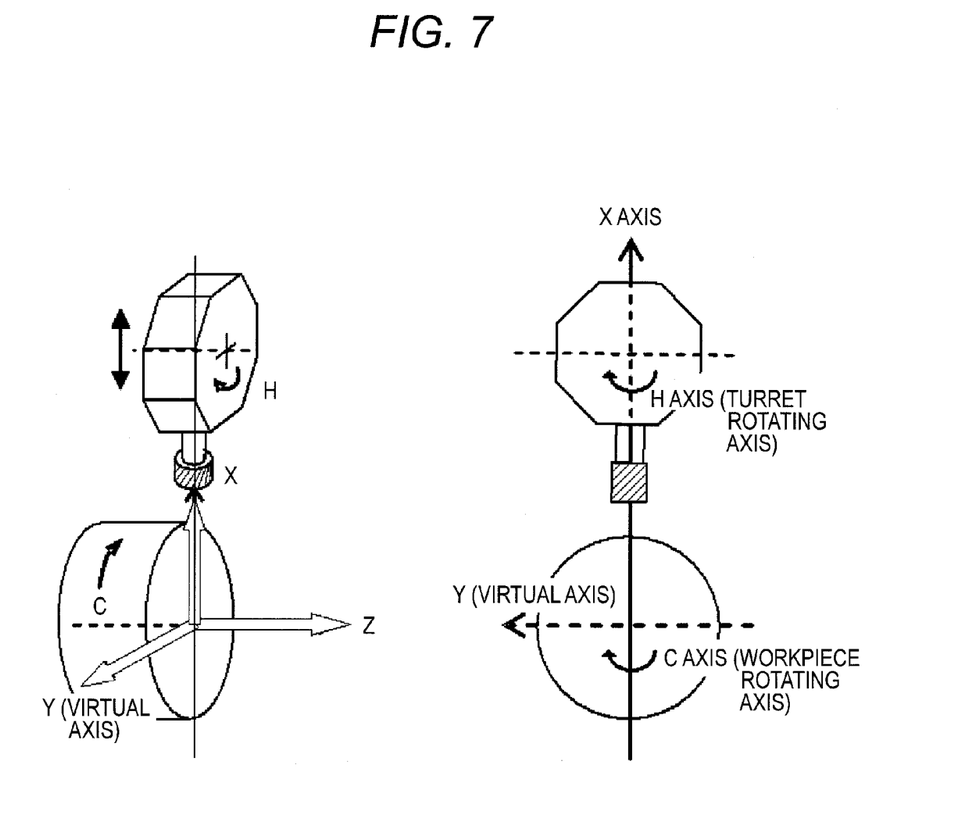
FIG. 7 is a diagram illustrating the configuration of basic axes of a machine under virtual Y axis control.

In the machine structure of the related art having a set of X, Z, H, and C axes and an S axis as a synchronized tapping spindle shown in FIG. 7, a turret axis (H axis) that can rotate in the circumferential direction of an X axis direction (in the radius direction of a workpiece) is disposed to be movable in the X axis direction with respect to the C axis holding the workpiece and the rotation of the H axis can be controlled to a desired angle. This machine can perform control as if a Y axis is present, without the Y axis as an actual axis, that is, can perform virtual Y axis control.

According to this configuration, by synchronously rotating the H axis and the C axis by an equal angle and causing a rotating tool of the H axis to approach and separate in the X axis direction in synchronization with the rotation, it is possible to perform a D-cut machining process or machining processes such as cutting or drilling in a direction perpendicular to a plane, in which the plane is imagined at a position separated from the center of the workpiece.

In order to perform, for example, a synchronized tapping process on the machined D-cut surface by the use of a machine having the above-mentioned configuration, it is necessary to perform X-axis feed based on cooperation of the C axis, the H axis, and the X axis, synchronous rotation of the C axis and the H axis maintaining the angles thereof so that the tool feed direction is perpendicular to the Y axis, and synchronous rotation control rotating a tapping tool on an S axis which is a spindle for a rotating tool in accordance with a screw pitch and a feed speed.

Figure 1:
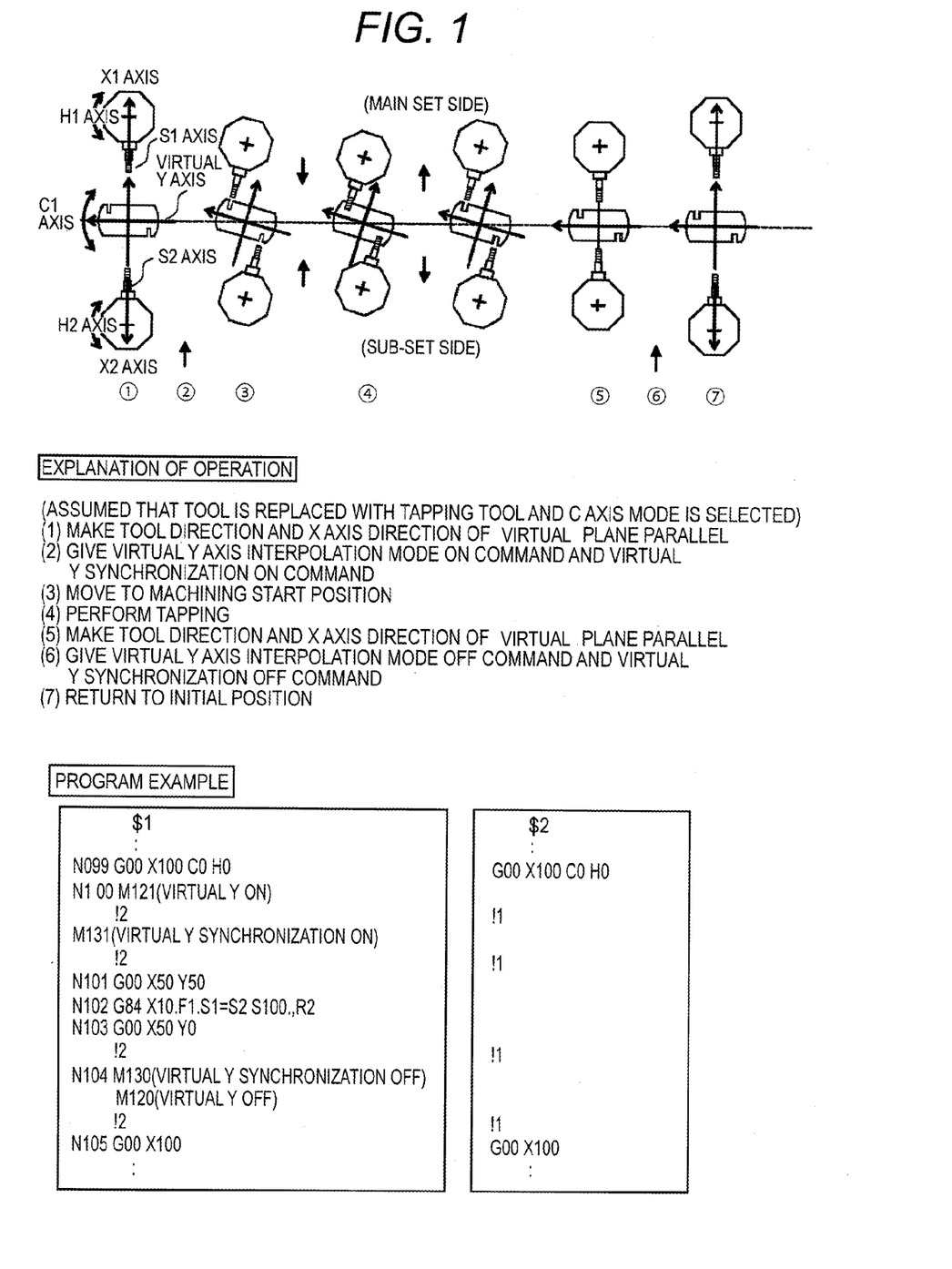
FIG. 1 is a diagram illustrating an operational example of a simultaneous synchronized tapping process using virtual Y axis control according to Embodiment 1 of the invention and an example of a machining program thereof.

In the related art, in the machine having a set of the X, Z, H, and C axes and the S axis as a synchronized tapping spindle, it is possible to perform the synchronized tapping process with the same control as the normal synchronized tapping. However, in order to simultaneously perform two synchronized tapping processes on both surfaces of a spanner-cut as shown in FIG. 1, it is necessary to add a tool base including an H2 axis, an X2 axis, and an S2 axis to the existing tool base (tool base including the H1 axis, the X1 axis, and the S1 axis) at a position point-symmetric about the workpiece. Since the Z axis has a relative relationship between the tool and the workpiece, the Z axis may be provided in any of the tool base and the workpiece support, but is generally provided in the tool base.

However, when the tool base is merely added, it is not possible to appropriately perform a synchronized tapping process if the movements of two tool bases and the spindles of two rotating tools on the two tool bases are not synchronized.

When driving two tapping tools in the tool axis direction with a same speed pattern to rotate in the circumferential direction, motors with different specifications may be used for axes having the same name, and thus, acceleration and deceleration patterns or acceleration and deceleration time constants may differ. Accordingly, it is necessary to match them. Especially, screw threads may deform if attention is not paid to the synchronized tapping spindle.

The invention is made to solve the above-mentioned problems and an object thereof is to provide a numerical control device which can accurately simultaneously perform a synchronized tapping process on both surfaces in the diameter direction of a workpiece by controlling a machine in which a main set including an X1 axis, an H1 axis, and an S1 axis and a sub-set including an X2 axis, an H2 axis, and an S2 axis are arranged to have point symmetry about a single C1 axis.

Means for Solving the Problem

A numerical control device of the invention is a numerical control device that is configured to control a machine in which a main set including an X1 axis, an H1 axis, and an S1 axis and a sub-set including an X2 axis, an H2 axis, and an S2 axis are arranged point-symmetric with respect to a single C1 axis, the numerical control device including: tapping spindle (S1, S2) time constant selecting means configured to compare acceleration and deceleration time constants of the S1 axis and the S2 axis of the main set and the sub set and selecting the larger time constant; drilling axis (X1) acceleration and deceleration processing means configured to calculate an acceleration and deceleration movement amount of the X1 axis based on the spindle time constant selected by the tapping spindle (S1, S2) time constant selecting means and a commanded spindle rotation number and perform acceleration and deceleration; tapping spindle (S1)-drilling axis (X1) synchronization processing means configured to calculate a rotation amount of a tapping spindle from X1 axis movement amount output from the drilling axis (X1) acceleration and deceleration processing means; and tapping spindle (S2) synchronization processing means configured to transfer the rotation amount of the tapping spindle calculated by the tapping spindle (S1)-drilling axis (X1) synchronization processing means as synchronization data to the synchronized side, wherein the machine is controlled to simultaneously perform a synchronized tapping process on both surfaces in a diameter direction of a workpiece held by the C1 axis by driving the X2 axis, the H2 axis, and the S2 axis of the sub-set using drive data of the X1 axis, the H1 axis, and the S1 axis of the main set.

Further, a numerical control device of the invention is a numerical control device that is configured to control a machine in which a main set including an X1 axis, an H1 axis, and an S1 axis and a sub-set including an X2 axis, an H2 axis, and an S2 axis are arranged point-symmetric with respect to a single C1 axis, the numerical control device including: simultaneous synchronized tapping command processing means configured to simultaneously drive a plurality of tool spindles to newly set a simultaneous synchronized tapping command for performing a synchronized tapping process and analyze and process the simultaneous synchronized tapping command; tapping spindle (S1, S2) time constant selecting means configured to compare acceleration and deceleration time constants of the S1 axis and the S2 axis of the main set and the sub set and selecting the larger time constant; drilling axis (X1) acceleration and deceleration processing means configured to calculate an acceleration and deceleration movement amount of the X axis based on the spindle time constant selected by the tapping spindle (S1, S2) time constant selecting means and a commanded spindle rotation number and perform acceleration and deceleration; tapping spindle (S1)-drilling axis (X1) synchronization processing means configured to calculate a rotation amount of a tapping spindle from X axis movement amount output from the drilling axis (X1) acceleration and deceleration processing means; and tapping spindle (S2) synchronization processing means configured to transfer the rotation amount of the tapping spindle calculated by the tapping spindle (S1)-drilling axis (X1) synchronization processing means as synchronization data to the synchronized side, wherein the machine is controlled to simultaneously perform a synchronized tapping process on both surfaces in a diameter direction of a workpiece held by the C1 axis by driving the X2 axis and the H2 axis of the sub-set using drive data of the X1 axis and the H1 axis of the main set, and for the S1 axis and the S2 axis, by driving the synchronized side S axis by S axis driving data which is defined as reference in reference synchronized definition defined in a simultaneous synchronized tapping command.

Advantageous Effects

According to the invention, it is possible to easily perform satisfactory simultaneous synchronized tapping control with a maximum torque without causing a servomotor of a rotating tool driving unit of each of both sets to vibrate. Accordingly, since the synchronized tapping process on both surfaces of a workpiece is completed in half a time of the conventional art, an industrial effect of doubling the productivity is achieved.

According to the invention, it is possible to select which of the spindles of both sets should be set as a reference and to easily perform satisfactory simultaneous synchronized tapping control with a maximum torque without causing a servomotor of a rotating tool driving unit of each of both sets to vibrate. Accordingly, since the synchronized tapping process on both surfaces of a workpiece is completed in half a time of the conventional art, an industrial effect of doubling the productivity is achieved.

BEST MODE FOR CARRYING OUT THE INVENTION

Embodiment 1

Hereinafter, Embodiment 1 of the invention will be described with reference to FIGS. 1 to 7.

FIG. 1 is a diagram illustrating an operational example of a simultaneous synchronized tapping process performed on both surfaces (front and rear surfaces) of a spanner-cut formed in a workpiece by controlling a machine in which a main set including an X1 axis, a Z1 axis, a first turret axis (H1 axis), and an S1 axis and a sub-set including an X2 axis, a Z2 axis, a second turret axis (H2 axis), and an S2 axis are arranged to have point symmetry about a single C1 axis controlling and rotating the workpiece and a program example thereof, according to Embodiment 1 of the invention. Here, pilot holes of taps are simultaneously drilled on both surfaces and then a tapping process is simultaneously performed on both surfaces, but the machining program show only a part related to the tapping process. The tapping process does not employ a method using a floating tap automatically cutting in with the thrust of the tap by merely rotating the spindle, but employs a synchronized tap or a rigid tap holding a tapping bit (tapping tool) with a synchronized tapping spindle chuck and controlling the cut-in using an NC device by synchronizing feed of the tap with rotation of the tap.

Since the movement direction of the Z axis is perpendicular to the XY plane and the movement plane of the H axis and the C axis and does not affect the basic operation of Embodiment 1 of the invention, the Z axis is mentioned as an axis name but the operation thereof will not be described herein.

When the same number of driving units are provided to the machine in which the main set including the X1 axis, the Z1 axis, the first turret axis (H1 axis), and the S1 axis and the sub-set including the X2 axis, the Z2 axis, the second turret axis (H2 axis), and the S2 axis are arranged to have point symmetry about the single C1 axis and the same command, for example, the movement amount of the main set, is given to the other set arranged to face the main set, it is assumed that the same command such as a movement amount of the main set is given to the opposite set arranged symmetrically. Then, only when tools and tool holds are completely the same and the tool corrections are the same (when two tools having the same dimensional data are equivalently mounted on both turrets), the simultaneous drilling process or the tapping process can be performed at positions having point symmetry on both surfaces of the spanner-cut. In the actual simultaneous synchronized tapping process, when motors for synchronized tapping spindles having different specifications or different loads, acceleration and deceleration parameters suitable for the motors are set, but it is necessary to unify these parameters into the optimum values when simultaneously performing the synchronized tapping process.

Therefore, the movement amounts of the X, H, Z, and S axes of two sets should be calculated, acceleration and deceleration parameters and the like should be selected and set again, and two sets should be made to move in completely synchronization including a movement start time.

In Embodiment 1 of the invention, by controlling the machine having the above-mentioned new configuration as described above, it is possible to perform a simultaneous synchronized tapping process of performing a synchronized tapping process, for example, using virtual Y axis control to a surface (a surface of a workpiece) by the use of a set (main set) including the C1 axis as a reference, the X1 axis, the Z1 axis, the H1 axis as a turret axis, and the S1 axis as a synchronized tapping spindle, and driving the H2 axis in synchronization with the main set to simultaneously perform a synchronized tapping process on the rear surface (the opposite surface of the surface in the diameter direction of the workpiece) by the use of a set (sub-set) including the X2 axis, the Z2 axis, the H2 axis, and the S2 axis.

FIG. 1 shows program examples of the systems. Based on the details of the blocks having sequence numbers N101 to N103 in the programs, the reference axis and the synchronized axis move in the same way to simultaneous perform the synchronized tapping process and to perform the synchronized tapping process on both surfaces of the workpiece. Here, the turret axis of the main set and the turret axis of the sub-set are arranged to face each other with the C1 axis holding the workpiece interposed therebetween.

Virtual Y axis machining (control) is required for performing the D-cut machining process with the machine, but as prior preparation for the virtual Y axis machining process, but it is necessary to replace the tools with tapping tools and to switch the axis rotating the workpiece to a C axis control mode.

In performing a double D-cut machining process with the machine shown in FIG. 1, first, the tool direction and the X axis direction of a virtual plane are made to be parallel to each other as shown in FIG. 1 (G0Xx1H0C0; is given to each system). A tool tip (center) is located at a position separated x1 in the X axis direction from the C axis center and the C1 axis and the H axis are positioned relatively at 0 degrees in response to the command (the state of (1) in FIG. 1). After the positioning is performed on both the main set and the sub-set, a virtual Y axis interpolation mode command (for example, M121) is given by the machining program of the main set (system 1 $1) to establish the virtual Y axis interpolation mode. Then, a virtual Y axis synchronization command (for example, M131) is given to simultaneously perform the virtual Y axis machining process in synchronization by the use of two systems. Subsequently, a command (for example, when "2" is given to the main set and "!1" is given to the sub-set using a command "!", the main set and the sub-set are synchronously on standby) of causing the main set and the sub-set (system 2 $2) to be synchronously on standby is given (the state of (2) in FIG. 1).

Figure 2:
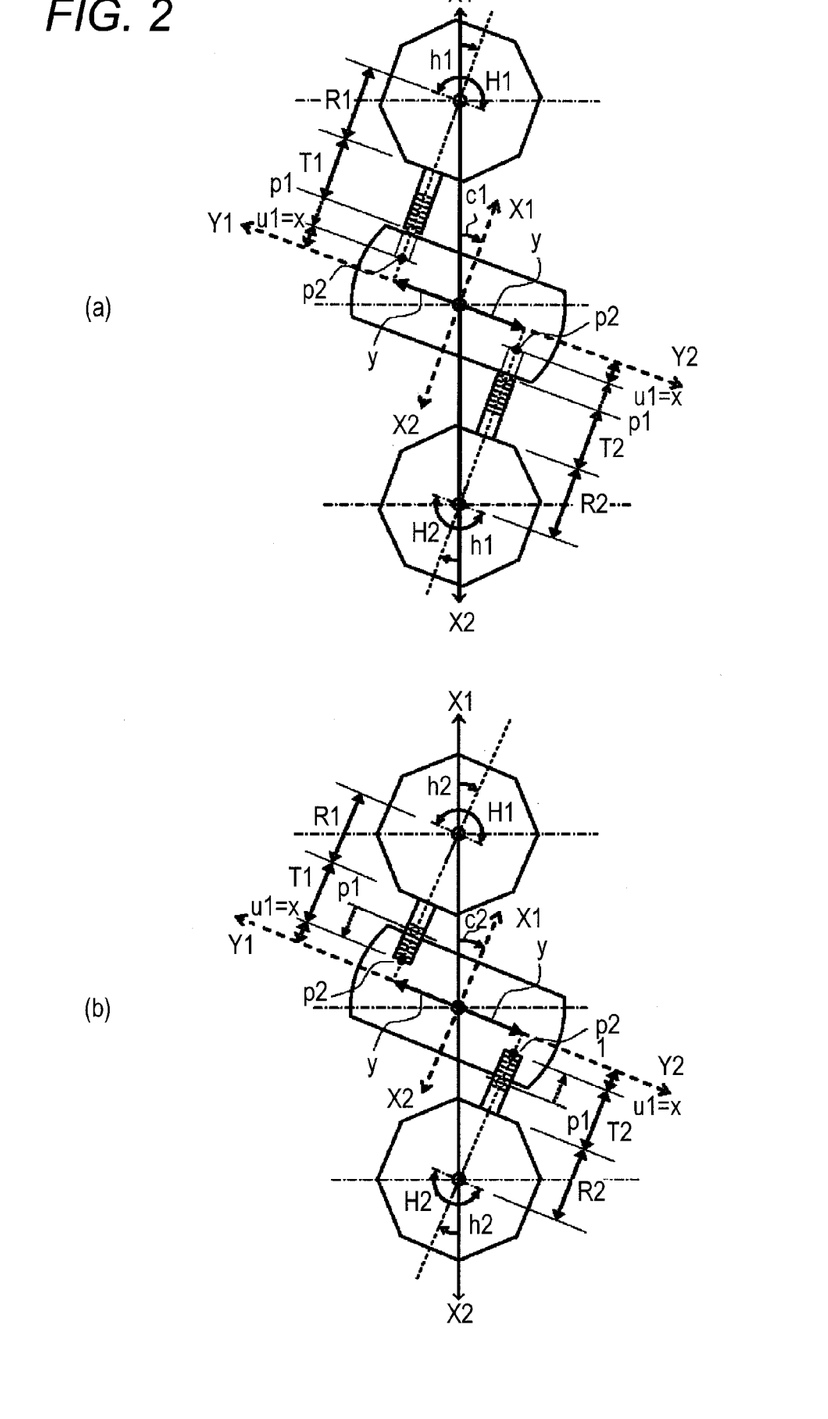
FIG. 2 is a diagram illustrating the details of the simultaneous synchronized tapping operation using the virtual Y axis control according to Embodiment 1 of the invention.

When a positioning command to a machining start position (the coordinate value of the virtual Y axis) is given, the angle of the C axis is calculated so that the center of a cutting edge of the tool is located at the position of the virtual Y axis, which is set in the coordinate system, of an end face of the workpiece, the C axis and the H axis are made to rotate, and the center of the H axis moves along the X axis. When the amount of displacement of the D-cut surface from the C axis center is designated, the tool center is made to move so that the tool tip matches the position Xp1 on the virtual Y axis as shown in FIG. 2(*a*) (the state of (3) in FIG. 1). In the program example shown in FIG. 1, a command G00 X50 Y50 correspond to the above-mentioned commands. Then, the X coordinate value of the simultaneous synchronized tapping command (G84×10. F1. S1=S2 S100., R2) is read, the tapping bit is made to move to Xul (X10 in the program example shown in FIG. 1) which is the position of an end point (tap hole bottom), and the tapping process is simultaneously performed while rotating the spindle by the angle corresponding to the movement amount per control unit time of the X axis. When the tapping bit reaches the hole bottom p2 (=Xul) as shown in FIG. 2(*b*), the tool spindle is inverted, the tapping bit is pulled out while being inverted, the synchronized tapping process is ended at the point at which the tapping bit is returned to the position of p1 (the state of (4) in FIG. 1). Subsequently, (by giving the command G00 X50 Y0 in the program example shown in FIG. 1) the tool is retracted to a position at which the workpiece and the tool do not interfere with each other and the tool direction, the X axis direction of the virtual plane are matched with each other (the state of (5) in FIG. 1). A virtual Y axis synchronization cancelling command (for example, M130) is given, a virtual Y axis interpolation mode cancelling command (for example, M120) is given, and the virtual Y axis control mode is ended (the state of (6) in FIG. 1). Finally (by giving a command G00 X100 in the program example shown in FIG. 1), the turret mounted with the tapping bit is returned to the initial position (the state of (7) in FIG. 1).

In this way, the simultaneous tapping process can be performed on both sides of a workpiece using the machining program of one synchronized tapping process to the main set (system 1). However, this control is possible only when tools having the same dimensional data are mounted on the turret axes of the main set and the sub-set. In the simultaneous tapping process, the sub-set uses control and drive data calculated for the main set. Coordinate transformation from the virtual axis to the real axis is performed, and the main set, the sub-set, and the C1 axis can perform the simultaneous synchronized tapping process by inputting X1 axis data calculated for the main set to the X2 axis, inputting the H1 axis data to the H2 axis and the C1 axis, and inputting the S1 axis data to the S2 axis after being synchronized with the Z1 axis.

When a machining end point position (hole bottom position) is designated by the machining program, p2 is similarly calculated and the line connecting p1 and p2 is linearly interpolated in the virtual XY plane. The movement amount is transformed to the real-axis position of the X axis, the H axis (rotating axis), and the C axis (rotating axis), and the resultant is output to the servo control units of the axes to drive the corresponding servomotors. Accordingly, the vertical movement in the real X axis direction of the turrets, the rotation of a workpiece held on the C axis, and the position control with respect to the C axis of the turrets are performed in cooperation. As a result, at the position separated by a designated distance from the center of the workpiece, the feed control of the drilling, the tap feeding, or the like is performed to be perpendicular to the plane perpendicular to the radius direction.

The start point and the bottom position of the eccentric hole in the virtual Y axis shown in FIG. 2 are on the straight line connecting the center of the H axis and the center of the tool tip. By merely moving the H axis toward the center of the C axis in parallel in the state shown in FIG. 2(*a*), the state shown in FIG. 2(*b*) is not obtained and deviation is caused to the bottom position to form a hole having a long cross-section, whereby an appropriate machining process cannot be performed. Therefore, in the cut-in the depth direction at an eccentric position in the virtual Y axis, it is possible to change the rotational angles of the H axis and the C axis depending on the distance between the H axis and the C axis, as well as the position control of the H axis toward the C axis.

Figure 3:
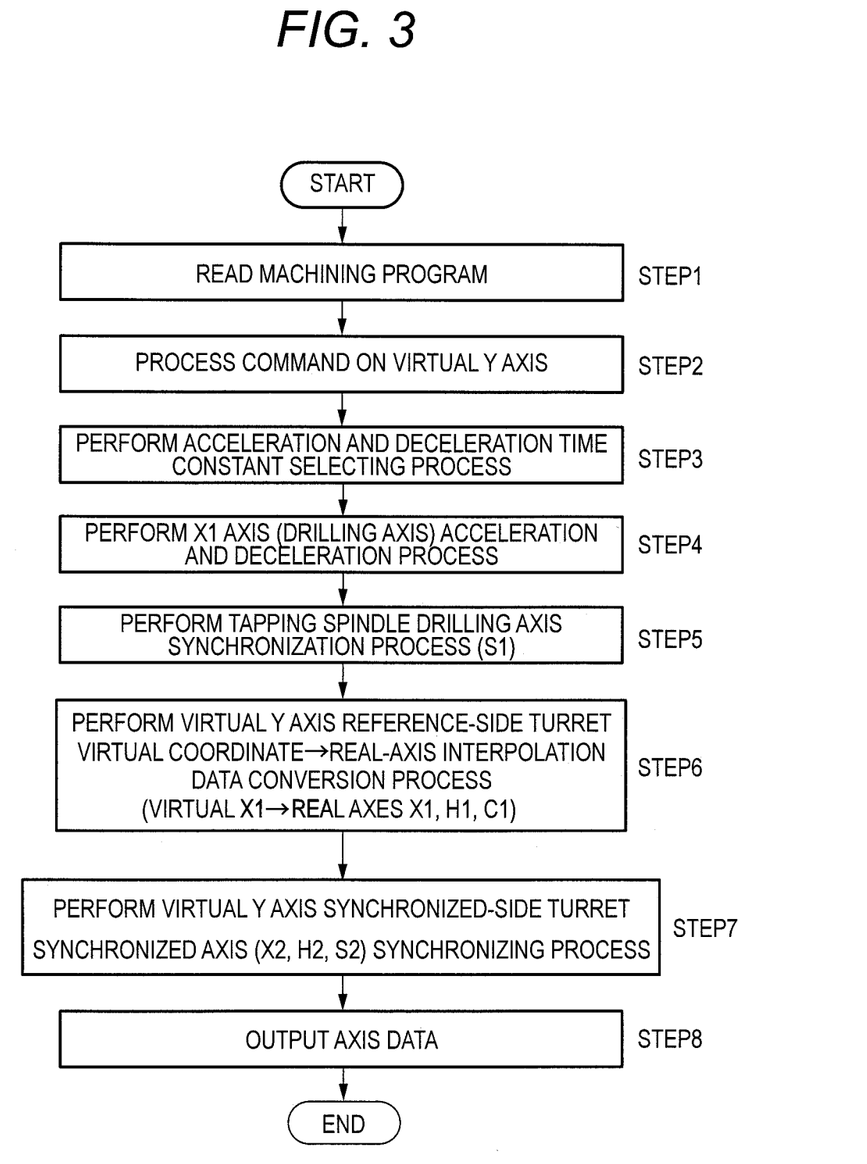
FIG. 3 is a flowchart illustrating the simultaneous synchronized tapping control using the virtual Y axis control according to Embodiment 1 of the invention.

FIG. 3 shows an exemplary flowchart illustrating the simultaneous synchronized tapping process in the NC device according to Embodiment 1 of the invention.

A machining program is read in step 1, and a program command for the virtual Y axis is analyzed to execute a predetermined processing program in step 2. A virtual Y axis interpolation mode ON/OFF command, that is, M121/M120 in this embodiment, is used as the command for the virtual Y axis. In response to M121, a switching processing unit that enables the interpolating calculation in the virtual XY plane and that selects a machining process on the XZ plane as a normal turning machine and a machining process under the control using the virtual Y axis is activated. The method of outputting M121/M120 to the outside and inputting the commands as an external input signal to the NC device again through the use of a PLC (Programmable Logic Controller) is employed, but the commands may be switched in the NC device.

As another command, there is a command M131 (virtual Y axis synchronization ON/OFF command) for synchronously controlling two turret axes in the virtual Y axis. By giving the command M131, it is considered that the H2 axis is driven using the H1 axis data, and the command M131 is cancelled by giving a command M130, and the turret axes are independently driven.

The synchronized tapping command G84 in the machining program read in step 1 indicates synchronized tapping with an orient command added thereto, has a format of G84×FpSs, R2;, where Fp represents the pitch, Ss represents the spindle rotation number, and ",R2" represents that synchronized tapping is started after orientation, and is a standard command, but can designate which of two synchronized tapping spindles S1 and S2 should be used to perform the synchronized tapping by adding designation of S2=S1 or S1=S2, which is not present in a standard command.

Figure 5:
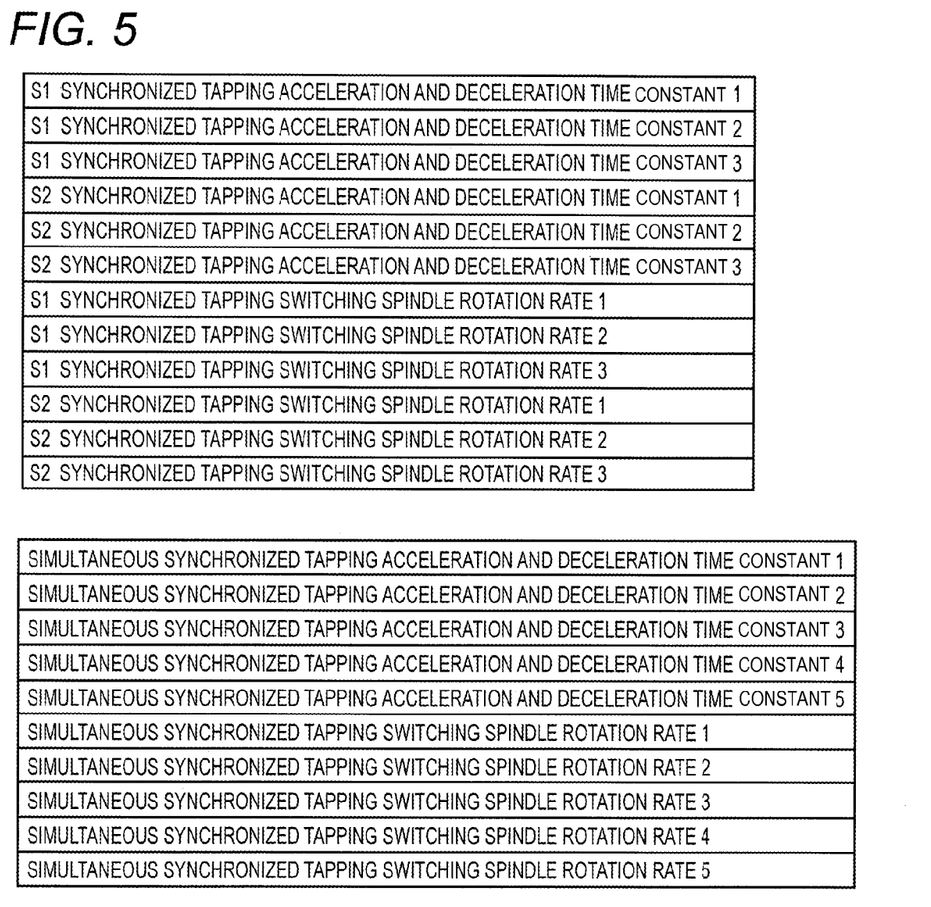
FIG. 5 is a diagram illustrating examples of acceleration and deceleration parameters for a synchronized tapping spindle according to Embodiment 1 of the invention.
Figure 6:
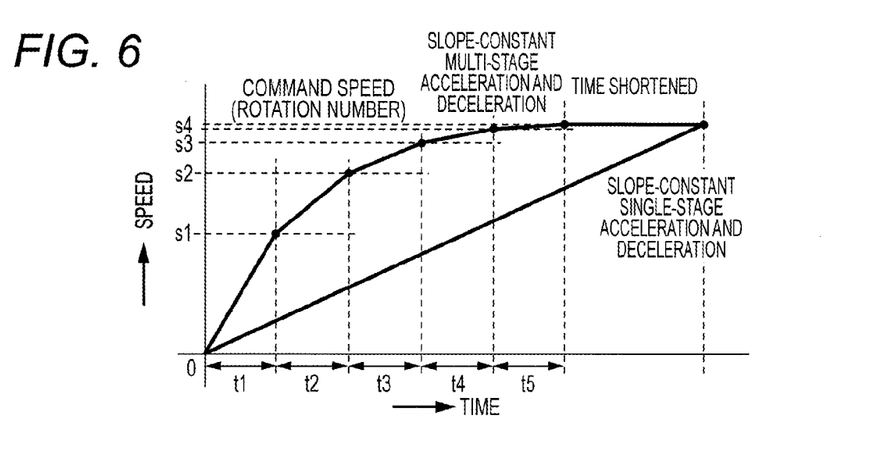
FIG. 6 is a diagram illustrating an example of a typical multi-stage acceleration and deceleration pattern with a constant slope.

In step 3, the synchronized tapping switching spindle rotation rate and the synchronized tapping acceleration and deceleration time constant at each stage of multi-stage acceleration and deceleration, for example, shown in FIG. 5 are compared between the two synchronized tapping spindles S1 and S2, and the optimum synchronized tapping acceleration and deceleration time constant and the synchronized tapping switching spindle rotation rate with a slow acceleration are selected and are stored in each stage of a simultaneous synchronized tapping optimal multi-stage acceleration and deceleration selecting memory. Multi-stage acceleration and deceleration control shown in FIG. 6 is often applied to the synchronized tapping spindle in order to reduce the acceleration and deceleration time to the minimum and to enhance the machining efficiency, but is a method capable of controlling the driving with the maximum torque in which parameters are set for each axis.

In step 4, a stage in which the spindle rotation rate during acceleration/deceleration is equal to or less than the simultaneous synchronized tapping switching spindle rotation rate and equal to or more than the simultaneous synchronized tapping switching spindle rotation rate is retrieved from the synchronized tapping acceleration and deceleration time constant and the simultaneous synchronized tapping switching spindle rotation rate of each stage stored in the simultaneous synchronized tapping optimum multi-stage acceleration and deceleration selecting memory in step 3, and the accelerated or decelerated movement amount (rotational angle) is calculated from the synchronized tapping acceleration and deceleration time constant set in the corresponding stage and the spindle rotation range of the corresponding stage. The accelerated movement amount of the X1 axis determined based on the calculated acceleration and deceleration movement amount (rotational angle) and the pitch is acquired and is subjected to an acceleration and deceleration process so as to be stopped at the command position (hole bottom position).

In step 5, the X1 axis movement amount (FdT) having been subjected to the acceleration and deceleration process in step 4 is converted into S1 axis rotational angle (FdT) per the same control unit time.

In step 6, the X1 axis coordinate value in the virtual coordinate system is transformed to the real-axis coordinate values of X1 H1, and C1 and the movement amounts (FdT) of the real axes X1, H1, and C1 based on the difference from the previous real-axis coordinate values per control unit time.

In step 7, the S1 axis rotational angle (FdT) for the synchronized tapping real axis converted in step 5 is copied and used as the synchronized movement amount of the S2 axis.

The real-axis movement amounts (FdT) of X1 and H1 transformed in step 6 is copied and used as synchronized movement amounts of the X2 axis and the H2 axis of the synchronized turret.

In this embodiment, the control in which the main set is defined as the reference side and the sub-set is defined as the synchronized side is performed. However, when it is wanted to invert the reference side and the synchronized side of the two synchronized tapping spindles S1 and S2, a command "S2=S1" is given to the simultaneous synchronized tapping command, whereby the S2 axis is set as the reference side, the S1 axis is set as the synchronized side, and the S2 axis rotational angle (FdT) calculated for the S2 axis is copied for the S1 axis and used as the synchronized movement amount of the S1 axis.

In step 8, the real-axis movement amounts (FdT) for the real axes X1, H1, and C1 to which the synchronized tapping spindles S1 and S2 and the synchronized tapping drilling axis are transformed in coordinates through the above-mentioned process and the real axes X2 and H2 of the synchronized tapping drilling axis are output to the servo control units.

The simultaneous synchronized tapping process using a combined turning machine under virtual Y axis control can be embodied through the above-mentioned processes, and more details thereof will be described later with reference to FIG. 4.

In the machining program of the simultaneous synchronized tapping process, since the operations of both sides are the same, the command program is given to only the first system and the commands of the first system are used for the axes of the second system. The temporal relationship between the start and the end of other machining operations in the actual simultaneous synchronized tapping process is controlled using a synchronous standby command (for example, the command "!O" shown in the machining program example of FIG. 1).

Figure 4:
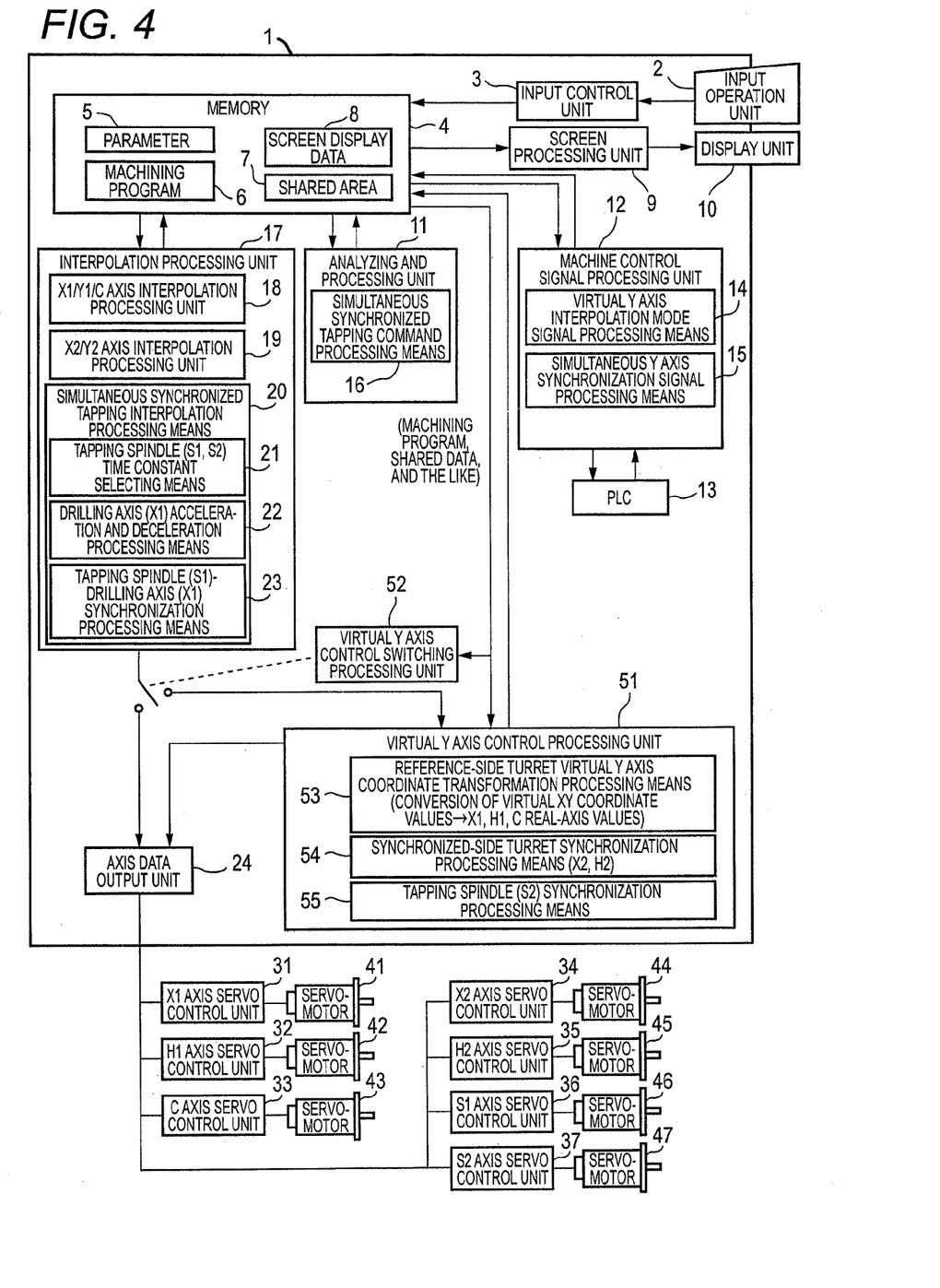
FIG. 4 is a block diagram illustrating the configuration of a numerical control device according to Embodiment 1 of the invention.

FIG. 4 is a block diagram illustrating an example of the configuration of the NC device according to Embodiment 1 of the invention.

Reference sign 1 represents an NC device, reference sign 2 represents an input operation unit, reference sign 3 represents input control unit, reference sign 4 represents a memory, reference sign 5 represents a parameter storage unit, reference sign 6 represents a machining program storage unit, reference sign 7 represents a shared area, reference sign 8 represents a screen display data storage unit, reference sign 9 represents a screen processing unit, and reference sign 10 represents a display unit. Reference sign 11 represents an analyzing and processing unit, reference sign 12 represents a machine control signal processing unit, reference sign 13 represents a PLC, reference sign 14 represents virtual Y axis interpolation mode signal processing means, reference sign 15 represents virtual Y axis synchronization signal processing means, reference sign 16 represents simultaneous synchronized tapping command processing means, reference sign 17 represents an interpolation processing unit, reference sign 18 represents X1/Y1/C1 axis interpolation processing means, reference sign 19 represents X2/Y2 axis interpolation processing means, reference sign 20 represents simultaneous synchronized tapping interpolation processing means, reference sign 21 represents tapping spindle (S1, S2) time constant selecting means, reference sign 22 represents drilling axis (X1) acceleration and deceleration processing means, reference sign 23 represents tapping spindle (S1)-drilling axis (X1) synchronization processing means, and reference sign 24 represents an axis data output unit. Reference signs 31 to 37 represent servo control units of X1 X2, H1, H2, C1, S1, and S2 axes, respectively, and reference signs 41 to 47 represent servomotors of X1, X2, H1 H2, C1, S1, and S2 axes, respectively. Reference sign 51 represents a virtual Y axis control processing unit, reference sign 52 represents a virtual Y axis control switching processing unit, reference sign 53 represents reference-side turret virtual Y axis coordinate transformation processing means, reference sign 54 represents synchronized-side turret synchronization processing means (X2, H2), and reference sign 55 represents tapping spindle (S2) synchronization processing means.

The operations will be described below. In the NC device 1, the input control unit 3 senses a variation of a switch signal of the input operation unit 2 operated by an operator, accesses the parameter storage unit 5, the machining program storage unit 6, the shared area 7, and the screen display data area 8 in the memory 4, and gives writing or reading signals for changing the contents of the memory thereto. Various display data stored in predetermined addresses of the screen display data area 8 are read by the screen processing unit 9 and data are displayed at predetermined positions on the display unit 10.

The parameters stored in the parameter storage unit 5 include an acceleration and deceleration time constant parameter for the synchronized tapping spindle shown in FIG. 5 and condition data necessary for determining the specification of the NC device or controlling the machine. In the machining program, operation details of the machine or moving paths of the cutting edge necessary for machining at least one workpiece are described and stored in the format which can be read by the NC device. The shared area 7 stores temporary data or the like necessary for analyzing the machining program or control of the system in control of the machine operation. The screen display data area 8 stores various data such as present position information, spindle rotation information, control modes of the NC device, and output states of various selection signals, which are designated through the use of the input operation unit 2 and which are required by the operator.

The analyzing and processing unit 11 sequentially reads a designated program out of the machining program stored in the machining program storage unit 6 from the head, temporarily stores data under process or the like in the shared area 7 with reference to the parameters 5 through processing sequences designated for various NC commands, and analyzes and executes the program.

The machine control signal processing unit 12 reads information on the control of the peripherals of the machine output from the analyzing and processing unit 11 to the memory 4, outputs the read information to the PLC 13 to give control information to a ladder circuit, and outputs various control signals such as ON/OFF signals from an external input/output signal IT not shown to the machine. Signals for control of various units of the NC device input from the PLC 13 or external signals input from the machine are written to the shared area 7 of the memory 4 and are applied to the control of the NC device to correctly perform the control of the NC device and the machine.

When switching the ON/OFF of the virtual Y axis interpolation mode in response to a selection signal input from the outside of the NC device, the virtual Y axis interpolation mode signal processing means 14 receives the external signal input to the machine control signal processing unit 12 and sets or resets predetermined parameters. This switching control may be performed in the NC device in response to the commands in the machining program. In the invention, a method of converting the external signals into ON/OFF signals by the use of the auxiliary commands (M121 and M120) and inputting the resultant signals to the NC device is employed.

For example, when switching the ON/OFF of the virtual Y axis synchronization in response to a selection signal input from the outside of the NC device in order to simultaneously perform the virtual Y axis machining process in synchronization in two systems (turret 1 and turret 2) in the virtual Y axis interpolation mode, the virtual Y axis synchronization signal processing means 15 receives the external signal input to the machine control signal processing unit 12 and sets or resets predetermined parameters. The virtual Y axis synchronization command is given to simultaneously perform the virtual Y axis machining process in synchronization in two systems, but a method of converting the external signals into ON/OFF signals by the use of the auxiliary commands (M131 and M130) and inputting the resultant signals to the NC device is employed herein similarly to the virtual Y axis interpolation mode.

The simultaneous synchronization tapping command processing means 16 of the analyzing and processing unit 11 analyzes a simultaneous synchronized tapping command for simultaneously performing the synchronized tapping process known conventionally on both sides in the diameter direction of a workpiece using two systems of turret axes. In order to most simply perform the simultaneous synchronized tapping process, as shown in at least FIG. 2*a*, the same tapping bits are similarly mounted on the synchronized tapping spindle of two turret axes arranged in point symmetry about the C axis, the positions (X axis) of two turret axes form the center of a workpiece and the rotations of the turret axes are acquired through the interpolation of the reference-side system, and the X and H axes of the synchronized side are synchronously driven using drive data of the X and H axes of the reference side. The C axis rotating the workpiece is synchronously driven using the drive data of the H axis of the reference side, whereby the movement under simultaneous synchronized control can be embodied.

The interpolation processing unit 17 includes the X1/Y1/C1 axis interpolation processing means 18, the X2/Y2 axis interpolation processing means 19, and the simultaneous synchronized tapping interpolation processing means 20. The simultaneous synchronized tapping interpolation processing means 20 includes the tapping spindle (S1, S2) time constant selecting means 21, the drilling axis (X1) acceleration and deceleration processing means 22, and the tapping spindle (S1)-drilling axis (X1) synchronization processing means 23.

In the description of Embodiment 1 of the invention, since the Z axis which is the length direction of the workpiece is not directly involved in the virtual Y axis control machining process, the Z axis is not shown and the operation thereof is not described. A program for moving a tool to the machining start position before performing the simultaneous synchronized tapping process is necessary, but it is assumed that the tool centers corrected with the command positions are located at the position p1, as shown in FIG. 2*a*.

In the machining control of a normal turning machine, a linear or arc interpolating process is performed on the relative movement amounts acquired from the machining program using the interpolation processing means of the X1 axis, the Z1 axis, the C1 axis, the X2 axis, and the Z2 axis not shown in the interpolation processing unit 17, the output data are output to the axis data output unit 24 and are input to the servo control units 31 to 37 of the axes, and the servomotors 41 to 47 are rotationally driven with the drive power output from the servo control units 31 to 37. Accordingly, the X and Z axes, the spindle, the C axis, and the synchronized tapping spindle of a turning machine which is a machine to be controlled are driven to perform a desired machining process.

In the virtual Y axis control, the virtual Y axis control switching processing unit 52 is activated in response to the virtual Y axis interpolation mode signal input from the outside and switches the interpolation result of the interpolation processing unit 17 so as to be used in the virtual Y axis control processing unit 51. The virtual Y axis control processing unit 51 includes the reference-side turret virtual Y axis coordinate transformation processing means 53, the synchronized-side turret synchronization processing means (X2, H2) 54, and the tapping spindle (S2) synchronization processing means 55.

The tapping spindle (S1, S2) time constant selecting means 21 compares the acceleration and deceleration time constants, which includes the spindle rotation rates and the acceleration and deceleration time constant parameters, for example, shown in FIG. 5 of two main synchronized tapping spindles S1 and S2, at the same spindle rotation rate of S1 and S2, and stores the larger (smaller-slope) value, for example, in a predetermined place of the simultaneous synchronized tapping optimum multi-stage acceleration and deceleration selecting memory (the parameter storage unit 5). The multi-stage acceleration and deceleration control is often applied to the synchronized tapping spindle in order to reduce the acceleration and deceleration time to the minimum and to enhance the machining efficiency. This means that the drive control can be performed with the maximum torque by performing the linear acceleration or deceleration with a constant small slope in plural stages, for example, as shown in FIG. 6. In order to cope with this situation, as shown in FIG. 5, the synchronized tapping acceleration and deceleration time constant and the synchronized tapping switching spindle rotation rate for the synchronized tapping corresponding to a predetermined number of stages can be set for the multi-stage acceleration and deceleration control in the respective synchronized tapping spindles. In the example shown in FIG. 5, the number of stages of the multi-stage acceleration and deceleration is set to 3, but the number of stages of the multi-stage acceleration and deceleration is not limited thereto. In this technique, in case of the multi-stage acceleration and deceleration, the acceleration and deceleration time constants of the S1 and S2 axes at the same spindle rotation rate are compared and the larger value and the spindle rotation rate at which the acceleration and deceleration time constant is switched are stored in the corresponding stage of the simultaneous synchronized tapping optimum multi-stage acceleration and deceleration selecting memory (the parameter storage unit 5). In FIGS. 5 and 6, for example, simultaneous synchronized tapping acceleration and deceleration constant 1 in FIG. 5 corresponds to t1 in FIG. 6, simultaneous synchronized tapping acceleration and deceleration time constant 2 in FIG. 5 corresponds to t2 in FIG. 6, simultaneous synchronized tapping switching spindle rotation rate 1 in FIG. 5 corresponds to s1 in FIG. 6, and simultaneous synchronized tapping switching spindle rotation rate 2 in FIG. 5 corresponds to s2 in FIG. 6.

The drilling axis (X1) acceleration and deceleration processing means 22 causes the tapping spindle (S1, S2) time constant selecting means 21 to retrieve a stage in which the spindle rotation rate during acceleration/deceleration is equal to or less than the simultaneous synchronized tapping switching spindle rotation rate and equal to or more than the simultaneous synchronized tapping switching spindle rotation rate from the simultaneous synchronized tapping time constant and the simultaneous synchronized tapping switching spindle rotation rate of each stage stored in the simultaneous synchronized tapping optimum multi-stage acceleration and deceleration selecting memory in step 3, and calculates the accelerated or decelerated movement amount (rotational angle) from the simultaneous synchronized tapping time constant set in the corresponding stage and the spindle rotation range of the corresponding stage. For example, in FIG. 6, the accelerated or decelerated movement amount in the spindle rotation rate region of 0 to s1 is calculated as s1/t1 and the accelerated or decelerated movement amount in the spindle rotation rate region of s1 to s2 is calculated as (s2-s1)/t2. The accelerated movement amount of the X1 axis determined by the calculated accelerated or decelerated movement amount (rotational angle) and the pitch is calculated and the acceleration and deceleration process is performed to stop at the command position (hole bottom position).

The tapping spindle (S1)-drilling axis (X1) synchronization processing means 23 calculates the movement amount (rotational angle) of the synchronized tapping spindle to be rotated during the movement of the calculated movement amount (FdT) using Expression 1 based on the movement amount (FdT) per control unit time of the X1 axis, which is subjected to the acceleration and deceleration process and is output from the drilling axis (X1) acceleration and deceleration processing means 22.

Rotational angle (r/dT)=
X1 movement amount (mm/dT)÷
screw pitch (mm/r)    (Expression 1)

The reference-side turret virtual Y axis coordinate transformation processing means 53 adds the movement amount (FdT) of the X1 axis in the virtual coordinate system, which is output from the drilling axis (X1) acceleration and deceleration processing means 22, to the previous coordinate value of the X1 axis in the virtual coordinate system and calculates the present coordinate value of the X1 axis in the virtual coordinate system. Subsequently, the coordinate value of the X1 axis in the virtual coordinate system is transformed to the real-axis positions of the X1 axis, the H1 axis (rotating axis), and the C1 axis (rotating axis). By calculating the difference between the calculated real-axis positions and the previous real-axis positions per control unit time, the real-axis movement amounts (FdT) of the X1 axis, the H1 axis, and the C1 axis are output to the axis data output unit 24.

The synchronized-side turret synchronization processing means (X2, H2) 55 copies the real-axis movement amount (FdT) of the X1 axis output from the reference-side turret virtual Y axis coordinate transformation processing means 53 for the X2 axis of the sub-set and outputs the copied movement amount to the axis data output unit 24. Similarly, the real-axis movement amount (FdT) of the H1 axis is copied for the H2 axis of the sub-set and is output to the axis data output unit 24.

Accordingly, the sub-set linearly moves on the line connecting the synchronized tapping start position Xp1 and the hole bottom position Xp2 in the virtual coordinate system shown in FIG. 2.

The tapping spindle (S2) synchronization processing means 55 causes the tapping spindle (S1)-drilling axis (X1) synchronization processing means 23 to copy the rotational angle (FdT) of the S1 axis as a reference side for the S2 axis and to output the copied rotational angle to axis data output unit 24.

The X1 axis and the tapping spindle S1 in the virtual coordinate system are synchronously controlled and the X1 axis in the virtual coordinate system is transformed to the X1, H1, and C1 axes as the real axes, whereby the machine not having the Y axis in the main set can perform the synchronized tapping process at the position separated from the Y axis direction. By synchronously controlling the X2 axis, the H2 axis, and the S2 axis of the sub-set with reference to the main set, the synchronized tapping process can be performed on both surfaces of a spanner cut using the virtual Y axis controller having two system turrets. This configuration is only an example and can be modified in various forms.

It is stated above that the multi-stage acceleration and deceleration is used, but the same is true of single-stage linear acceleration and deceleration or exponential acceleration and deceleration. In any case, it is necessary to set the time constant or the servo response gain of the X axis, the H axis, and the C axis to the same value.

INDUSTRIAL APPLICABILITY

The numerical control device according to the invention can be suitably used to numerically control a machine in which a main set including an X1 axis, a Z1 axis, a first turret axis (H1 axis), and an S1 axis and a sub-set including an X2 axis, a Z2 axis, a second turret axis (H2 axis), and an S2 axis are arranged to be point symmetric with respect to a single C1 axis and to perform a synchronized tapping process.

The invention claimed is:

1. A numerical control device that is configured to control a machine in which a main set including an X1 axis, an H1 axis, and an S1 axis and a sub-set including an X2 axis, an H2 axis, and an S2 axis are arranged to face each other with respect to a single C1 axis, the numerical control device comprising:

tapping spindle (S1, S2) time constant selecting means configured to compare acceleration and deceleration time constants of the S1 axis and the S2 axis of the main set and the sub-set and select the larger time constant;

drilling axis (X1) acceleration and deceleration processing means configured to calculate an acceleration and deceleration movement amount of the X1 axis based on the spindle time constant selected by the tapping spindle (S1, S2) time constant selecting means and a commanded spindle rotation number and perform acceleration and deceleration;

tapping spindle (S1)-drilling axis (X1) synchronization processing means configured to calculate a rotation amount of a tapping spindle from X axis movement data which is an output of the drilling axis (X1) acceleration and deceleration processing means; and tapping spindle (S2) synchronization processing means configured to transfer the rotation amount of the tapping spindle calculated by the tapping spindle (S1)-drilling axis (X1) synchronization processing means as synchronization data to the synchronized side, wherein the machine is controlled to simultaneously perform a synchronized tapping process on both surfaces of a workpiece held by the C1 axis by driving the X2 axis, the H2 axis, and the S2 axis of the sub-set using drive data of the X1 axis, the H1 axis, and the C1 axis of the main set where an X axis command of a virtual coordinate system is coordinate-transformed.

2. A numerical control device that is configured to control a machine in which a main set including an X1 axis, an H1 axis, and an S1 axis and a sub-set including an X2 axis, an H2 axis, and an S2 axis are arranged to face each other with respect to a single C1 axis, the numerical control device comprising:

simultaneous synchronized tapping command processing means configured to simultaneously drive a plurality of tool spindles to newly set a simultaneous synchronized tapping command for performing a synchronized tapping process and analyze and process the simultaneous synchronized tapping command;

tapping spindle (S1, S2) time constant selecting means configured to compare acceleration and deceleration time constants of the S1 axis and the S2 axis of the main set and the sub-set and select the larger time constant;

drilling axis (X1) acceleration and deceleration processing means configured to calculate an acceleration and deceleration movement amount of the X1 axis based on the spindle time constant selected by the tapping spindle (S1, S2) time constant selecting means and a commanded spindle rotation number and perform acceleration and deceleration;

tapping spindle (S1)-drilling axis (X1) synchronization processing means configured to calculate a rotation amount of a tapping spindle from X axis movement data which is an output of the drilling axis (X1) acceleration and deceleration processing means; and tapping spindle (S2) synchronization processing means configured to transfer the rotation amount of the tapping spindle calculated by the tapping spindle (S1)-drilling axis (X1) synchronization processing means as synchronization data to the synchronized side, wherein the machine is controlled to simultaneously perform a synchronized tapping process on both surfaces of a workpiece held by the C1 axis by driving the X2 axis, the H2 axis, and the S2 axis of the sub-set using drive data of the X1 axis, the H1 axis, and the C1 axis of the main set where an X axis command of a virtual coordinate system is coordinate-transformed.

* * * * *